United States Patent
Zhou et al.

(10) Patent No.: US 8,923,175 B2
(45) Date of Patent: Dec. 30, 2014

(54) TIMING ADJUSTMENT IN MULTI-HOP COMMUNICATION SYSTEM

(75) Inventors: Yuefeng Zhou, Surrey (GB); Michael John Beems Hart, London (GB)

(73) Assignee: Fujitsu Limited, Kawasaki-shi (JP)

( * ) Notice: Subject to any disclaimer, the term of this patent is extended or adjusted under 35 U.S.C. 154(b) by 141 days.

(21) Appl. No.: 12/914,036

(22) Filed: Oct. 28, 2010

(65) Prior Publication Data

US 2011/0038293 A1    Feb. 17, 2011

Related U.S. Application Data

(63) Continuation of application No. 12/377,634, filed as application No. PCT/GB2007/002887 on Jul. 31, 2007.

(30) Foreign Application Priority Data

Aug. 18, 2006 (GB) .................................. 0616476.8

(51) Int. Cl.
| | |
|---|---|
| *H04B 7/14* | (2006.01) |
| *H04B 7/26* | (2006.01) |
| *H04W 56/00* | (2009.01) |
| *H04W 52/02* | (2009.01) |
| *H04B 7/155* | (2006.01) |
| *H04W 40/22* | (2009.01) |

(52) U.S. Cl.
CPC ........... *H04B 7/2606* (2013.01); *H04W 56/005* (2013.01); *H04W 52/0235* (2013.01); *H04B 7/155* (2013.01); *H04W 40/22* (2013.01)
USPC .......................................... 370/311; 370/315

(58) Field of Classification Search
None
See application file for complete search history.

(56) References Cited

U.S. PATENT DOCUMENTS

| | | | |
|---|---|---|---|
| 4,490,818 A | 12/1984 | Otsuka | ............................ 370/26 |
| 5,428,603 A | 6/1995 | Kivett | |

(Continued)

FOREIGN PATENT DOCUMENTS

| | | |
|---|---|---|
| EP | 0 132 406 A2 | 1/1985 |
| EP | 1 473 870 A3 | 12/2004 |

(Continued)

OTHER PUBLICATIONS

KIPO's Notice of Preliminary Rejection; Application No. 10-2010-7020075; pp. 3, Feb. 10, 2012.

(Continued)

*Primary Examiner* — John Blanton
*Assistant Examiner* — Alan Lindenbaum
(74) *Attorney, Agent, or Firm* — Baker Botts L.L.P.

(57) ABSTRACT

A timing adjustment method for use in a multi-hop communication system is provided. The system includes a source apparatus, a destination apparatus and one or more intermediate apparatuses, said source apparatus being operable to transmit information along a series of links forming a communication path extending from the source apparatus to the destination apparatus via the or each intermediate apparatus, and the or each intermediate apparatus being operable to receive information from a previous apparatus along the path and to transmit the received information to a subsequent apparatus along the path, the system being configured to transmit information in a plurality of consecutive labelled intervals. The method includes transmitting information in a first labelled interval from a first said apparatus along a plurality of consecutive links of said path via one or more said intermediate apparatuses to a second said apparatus, said information including a reference to a particular one of said labelled intervals and the transmission of that information incurring a delay such that the transmitted information, or information derived therefrom, is received by said second apparatus in a second labelled interval a number of such intervals after the first labelled interval. The method also includes adjusting said reference to form an adjusted reference referring to a further labelled interval the or another number of such intervals before or after the particular labelled interval.

14 Claims, 19 Drawing Sheets

(56) References Cited

U.S. PATENT DOCUMENTS

| | | | |
|---|---|---|---|
| 6,798,765 | B2 | 9/2004 | Larsson |
| 7,720,020 | B2 | 5/2010 | Larsson |
| 7,877,057 | B2 | 1/2011 | Izumikawa et al. ............. 455/7 |
| 2004/0142716 | A1 | 7/2004 | Orlik et al. |
| 2005/0136835 | A1 | 6/2005 | Suwa |
| 2005/0163088 | A1 | 7/2005 | Yamano et al. |
| 2005/0266896 | A1* | 12/2005 | Son et al. ................. 455/574 |
| 2005/0286454 | A1 | 12/2005 | Morimoto et al. |
| 2005/0288022 | A1* | 12/2005 | Ryu et al. ................. 455/439 |
| 2006/0013594 | A1* | 1/2006 | Sung et al. ................ 398/161 |
| 2006/0046643 | A1 | 3/2006 | Izumikawa et al. |
| 2006/0120303 | A1 | 6/2006 | Yarvis et al. |
| 2008/0031174 | A1* | 2/2008 | Saifullah et al. ............ 370/311 |

FOREIGN PATENT DOCUMENTS

| | | | | |
|---|---|---|---|---|
| EP | 1509050 | | 2/2005 | ............. H04Q 7/28 |
| EP | 1511336 | | 3/2005 | ............. H04Q 7/32 |
| EP | 1 533 950 | A1 | 5/2005 | |
| EP | 1 890 452 | A2 | 2/2008 | |
| GB | 2 301 734 | A | 12/1996 | |
| GB | 2 440 980 | A | 2/2008 | |
| GB | 2 440 981 | A | 2/2008 | |
| GB | 2 440 982 | A | 2/2008 | |
| GB | 2 440 983 | A | 2/2008 | |
| GB | 2 440 984 | A | 2/2008 | |
| GB | 2 440 985 | A | 2/2008 | |
| GB | 2 440 986 | A | 2/2008 | |
| JP | 58182928 | | 10/1983 | ............. H04B 7/15 |
| JP | 2004032 | | 1/1990 | ............. H04B 7/15 |
| JP | 2001103559 | | 4/2001 | ............. H04B 7/15 |
| JP | 2002/158609 | | 5/2002 | ............. H04B 7/24 |
| JP | 2002252587 | | 9/2002 | ............ H04B 7/212 |
| JP | 2006-074325 | | 3/2006 | ............. H04B 7/26 |
| JP | 2006074325 | | 3/2006 | ............. H04B 7/26 |
| JP | 2006101546 | | 4/2006 | ............. H04B 7/15 |
| JP | 2007/517416 | | 6/2007 | ............. H04B 7/15 |
| KR | 1020050025229 | | 3/2005 | ............. H04B 7/26 |
| TW | 200533125 | | 12/1993 | ............. H04L 25/52 |
| TW | 200610300 | | 6/2005 | ............. H04B 7/26 |
| WO | WO 00/42737 | | 7/2000 | |
| WO | WO 2005/067173 | | 7/2005 | ............ H04B 7/296 |
| WO | WO 2005/107377 | | 11/2005 | |
| WO | WO 2006/038781 | | 4/2006 | ............. H04L 12/24 |
| WO | WO 2008/020165 | | 2/2008 | |

OTHER PUBLICATIONS

Japanese Notice of Reasons for Refusal w/English translation; Application No. 2009/525093; pp. 5, Nov. 22, 2011.

Japanese Office Action w/English translation; Application No. 2010-231998; pp. 5, Dec. 13, 2011.

IEEE Computer Society, "IEEE Standards for Information Technology, 802.11g™," Part 11: Wireless LAN Medium Access Control (MAC) and Physical Layer (PHY) Specifications, Amendment 4: Further Higher Data Rate Extension in the 2.4 GHz Band, Jun. 27, 2003, 78 pages.

IEEE Computer Society and IEEE Microwave Theory and Techniques Society, "IEEE Standard for Local and Metropolitan Area Networks, 802.16™," Part 16: Air Interface for Fixed Broadband Wireless Access Systems, Oct. 1, 2004, 895 pages.

IEEE Computer Society and IEEE Microwave Theory and Techniques Society, "IEEE Standard for Local and Metropolitan Area Networks, 802.16e™," Part 16: Air Interface for Fixed and Mobile Broadband Wireless Access Systems; Amendment 2: Physical and Medium Access Control Layers for Combined Fixed and Mobile Operation in Licensed Bands and Corrigendum 1, Feb. 28, 2006, 864 pages.

Ming Ma et al., "Multi-Channel Polling in Multi-Hop Clusters of Hybrid Sensor Networks," Global Telecommunications Conference 2005. Globecom '05, IEEE Nov. 28, 2005 p. 8.

Japanese Office Action with English Translation, Application No. 2010-231999; pp. 3, Aug. 7, 2012.

Korean Office Action with English translation; Application No. 10-2010-7020075; pp. 8, Dec. 31, 2012.

Official Letter and Search Report of the Patent Office of Taiwan, w/English Translation; Application No. 99140761; pp. 11, Jun. 28, 2013.

Official Letter and Search Report of the Patent Office of Taiwan, w/English Translation; Application No. 99140759; pp. 11, Jul. 12, 2013.

Taiwanese Office Action and English translation; Application No. 99140761; pp. 5, Mar. 10, 2014.

United States Final Office Action; U.S. Appl. No. 12/914,059; pp. 23, filed Apr. 24, 2014.

\* cited by examiner

An example of sleep mode in WiMAX

The RS only relays uplink information for MS

If an RS does not have timing knowledge of a sleep-mode MS, then it cannot allocate resources on right time for relaying The algorithm in RS to solve the problem introduced by the asymmetric links between uplink and downlink

*If an RS cannot obtain enough control information for uplink, the BS may transmit a dedicated message to this RS to inform the scheduled events in uplink*

An MS requests to start sleep mode

A BS requests to start sleep mode

RS can ask BS to put an MS into sleep mode

An RS shall allocate bandwidth to MS on time for the scheduled transmission in MSs.

BS sends MOB_SLP-RSP to both RS and MS to stop the sleep mode

An RS can request to stop the sleep mode in an MS

An MS can requests to stop the sleep mode

An RS relays both uplink and downlink

An MS loses the synchronization with BS because the RS introduces one-frame delay.

When RS will delay timing-related control messages, it shall modify the messages to compensate the delay.

RS shall modify the timing information to make sure that the MS can receive the information during listening window The first listening windows in MS 2# has not been aligned with other MSs'

The first listening window of MS 2# is aligned with other MSs'

Example TDD frame structure from OFDMA physical layer of the IEEE802.16 standard

TIMING ADJUSTMENT IN MULTI-HOP COMMUNICATION SYSTEM

RELATED APPLICATION

The present application is a continuation application of pending U.S. patent application Ser. No. 12/377,634 with a filing date of Jul. 31, 2007, and entitled "Timing Adjustment in Multi-Hop Communication System," which claims foreign priority benefits under 35 U.S.C. §119 of International Application No. PCT/GB2007/002887, filed Jul. 31, 2007, entitled "Timing Adjustment in Multi-Hop Communication System" and United Kingdom Application No. GB 0616476.8, filed on Aug. 18, 2006, entitled "Communication Systems".

TECHNICAL FIELD

The present application relates generally to communication networks, and more particularly to timing adjustment in a multi-hop communication system.

CROSS-REFERENCE TO RELATED APPLICATIONS

This application relates to the following applications, each of which is incorporated herein by reference:
COMMUNICATION SYSTEMS, application Ser. No. 11/840,492, filed Aug. 17, 2007 and currently pending;
COMMUNICATION SYSTEMS, application Ser. No. 11/840,518, filed Aug. 17, 2007 and currently pending;
COMMUNICATION SYSTEMS, application Ser. No. 11/840,546, filed Aug. 17, 2007 and currently pending;
COMMUNICATION SYSTEMS, application Ser. No. 11/840,570, filed Aug. 17, 2007 and currently pending;
COMMUNICATION SYSTEMS, application Ser. No. 11/840,595, filed Aug. 17, 2007 and currently pending;
COMMUNICATION SYSTEMS, application Ser. No. 11/840,621, filed Aug. 17, 2007 and currently pending;
COMMUNICATION SYSTEMS, application Ser. No. 11/840,644, filed Aug. 17, 2007 and currently pending;
COMMUNICATION SYSTEMS, application Ser. No. 12/377,629, with a filing date of Jul. 31, 2007 and currently pending;
COMMUNICATION SYSTEMS, application Ser. No. 12/377,640, with a filing date of Jul. 31, 2007 and currently pending.

BACKGROUND

Currently there exists significant interest in the use of multihop techniques in packet based radio and other communication systems, where it is purported that such techniques will enable both extension in coverage range and increase in system capacity (throughout).

In a multi-hop communication system, communication signals are sent in a communication direction along a communication path (C) from a source apparatus to a destination apparatus via one or more intermediate apparatuses. FIG. 19 illustrates a single-cell two-hop wireless communication system comprising a base station BS (known in the context of 3 G communication systems as "node-B" NB) a relay node RN (also known as a relay station RS) and a user equipment UE (also known as mobile station MS). In the case where signals are being transmitted on the downlink (DL) from a base station to a destination user equipment (UE) via the relay node (RN), the base station comprises the source station (S) and the user equipment comprises the destination station (D). In the case where communication signals are being transmitted on the uplink (UL) from a user equipment (UE), via the relay node, to the base station, the user equipment comprises the source station and the base station comprises the destination station. The relay node is an example of an intermediate apparatus (I) and comprises: a receiver, operable to receive data from the source apparatus; and a transmitter, operable to transmit this data, or a derivative thereof, to the destination apparatus.

Simple analogue repeaters or digital repeaters have been used as relays to improve or provide coverage in dead spots. They can either operate in a different transmission frequency band from the source station to prevent interference between the source transmission and the repeater transmission, or they can operate at a time when there is no transmission from the source station.

FIG. 20 illustrates a number of applications for relay stations. For fixed infrastructure, the coverage provided by a relay station may be "in-fill" to allow access to the communication network for mobile stations which may otherwise be in the shadow of other objects or otherwise unable to receive a signal of sufficient strength from the base station despite being within the normal range of the base station. "Range extension" is also shown, in which a relay station allows access when a mobile station is outside the normal data transmission range of a base station. One example of in-fill shown at the top right of FIG. 20 is positioning of a nomadic relay station to allow penetration of coverage within a building that could be above, at, or below ground level.

Other applications are nomadic relay stations which are brought into effect for temporary cover, providing access during events or emergencies/disasters. A final application shown in the bottom right of FIG. 20 provides access to a network using a relay positioned on a vehicle.

Relays may also be used in conjunction with advanced transmission techniques to enhance gain of the communications system as explained below.

It is known that the occurrence of propagation loss, or "pathloss", due to the scattering or absorption of a radio communication as it travels through space, causes the strength of a signal to diminish. Factors which influence the pathloss between a transmitter and a receiver include: transmitter antenna height, receiver antenna height, carrier frequency, clutter type (urban, sub-urban, rural), details of morphology such as height, density, separation, terrain type (hilly, flat). The pathloss L (dB) between a transmitter and a receiver can be modelled by:

$$L=b+10n \log d \quad (A)$$

Where d (meters) is the transmitter-receiver separation, b(db) and n are the pathloss parameters and the absolute pathloss is given by $l=10^{(L/10)}$.

The sum of the absolute path losses experienced over the indirect link SI+ID may be less than the pathloss experienced over the direct link SD. In other words it is possible for:

$$L(SI)+L(ID)<L(SD) \quad (B)$$

Splitting a single transmission link into two shorter transmission segments therefore exploits the non-linear relationship between pathloss verses distance. From a simple theoretical analysis of the pathloss using equation (A), it can be appreciated that a reduction in the overall pathloss (and therefore an improvement, or gain, in signal strength and thus data throughput) can be achieved if a signal is sent from a source apparatus to a destination apparatus via an intermediate apparatus (e.g. relay node), rather than being sent directly from the source apparatus to the destination apparatus. If implemented appropriately, multi-hop communication systems can allow for a reduction in the transmit power of transmitters which facilitate wireless transmissions, leading to a reduction in interference levels as well as decreasing exposure to electromagnetic emissions. Alternatively, the reduction in overall pathloss can be exploited to improve the received signal quality at the receiver without an increase in the overall radiated transmission power required to convey the signal.

Multi-hop systems are suitable for use with multi-carrier transmission. In a multi-carrier transmission system, such as FDM (frequency division multiplex), OFDM (orthogonal frequency division multiplex) or DMT (discrete multi-tone), a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to channel induced distortion compared with single carrier systems. This is made possible by ensuring that the transmission rate and hence bandwidth of each subcarrier is less than the coherence bandwidth of the channel. As a result, the channel distortion experienced on a signal subcarrier is frequency independent and can hence be corrected by a simple phase and amplitude correction factor. Thus the channel distortion correction entity within a multicarrier receiver can be of significantly lower complexity of its counterpart within a single carrier receiver when the system bandwidth is in excess of the coherence bandwidth of the channel.

Orthogonal frequency division multiplexing (OFDM) is a modulation technique that is based on FDM. An OFDM system uses a plurality of sub-carrier frequencies which are orthogonal in a mathematical sense so that the sub-carriers' spectra may overlap without interference due to the fact they are mutually independent. The orthogonality of OFDM systems removes the need for guard band frequencies and thereby increases the spectral efficiency of the system. OFDM has been proposed and adopted for many wireless systems. It is currently used in Asymmetric Digital Subscriber Line (ADSL) connections, in some wireless LAN applications (such as WiFi devices based on the IEEE802.11a/g standard), and in wireless MAN applications such as WiMAX (based on the IEEE 802.16 standard). OFDM is often used in conjunction with channel coding, an error correction technique, to create coded orthogonal FDM or COFDM. COFDM is now widely used in digital telecommunications systems to improve the performance of an OFDM based system in a multipath environment where variations in the channel distortion can be seen across both sub-carriers in the frequency domain and symbols in the time domain. The system has found use in video and audio broadcasting, such as DVB and DAB, as well as certain types of computer networking technology.

In an OFDM system, a block of N modulated parallel data source signals is mapped to N orthogonal parallel sub-carriers by using an Inverse Discrete or Fast Fourier Transform algorithm (IDFT/IFFT) to form a signal known as an "OFDM symbol" in the time domain at the transmitter. Thus, an "OFDM symbol" is the composite signal of all N sub-carrier signals. An OFDM symbol can be represented mathematically as:

$$x(t) = \frac{1}{\sqrt{N}} \sum_{n=0}^{N-1} c_n \cdot e^{j2\pi n \Delta f t}, 0 \le t \le T_s \quad (1)$$

where $\Delta f$ is the sub-carrier separation in Hz, $T_s=1/\Delta f$ is symbol time interval in seconds, and $c_n$ are the modulated source signals. The sub-carrier vector in (1) onto which each of the source signals is modulated $c \in C_n$, $c=(c_0, c_1 \ldots c_{N-1})$ is a vector of N constellation symbols from a finite constellation. At the receiver, the received time-domain signal is transformed back to frequency domain by applying Discrete Fourier Transform (DFT) or Fast Fourier Transform (FFT) algorithm.

OFDMA (Orthogonal Frequency Division Multiple Access) is a multiple access variant of OFDM. It works by assigning a subset of sub-carriers, to an individual user. This allows simultaneous transmission from several users leading to better spectral efficiency. However, there is still the issue of allowing bi-directional communication, that is, in the uplink and download directions, without interference.

In order to enable bi-directional communication between two nodes, two well known different approaches exist for duplexing the two (forward or download and reverse or uplink) communication links to overcome the physical limitation that a device cannot simultaneously transmit and receive on the same resource medium. The first, frequency division duplexing (FDD), involves operating the two links simultaneously but on different frequency bands by subdividing the transmission medium into two distinct bands, one for forward link and the other for reverse link communications. The second, time division duplexing (TDD), involves operating the two links on the same frequency band, but subdividing the access to the medium in time so that only the forward or the reverse link will be utilizing the medium at any one point in time. Both approaches (TDD & FDD) have their relative merits and are both well used techniques for single hop wired and wireless communication systems. For example the IEEE802.16 standard incorporates both an FDD and TDD mode.

As an example, FIG. 21 illustrates the single hop TDD frame structure used in the OFDMA physical layer mode of the IEEE802.16 standard (WiMAX).

Each frame is divided into DL and UL subframes, each being a discrete transmission interval. They are separated by Transmit/Receive and Receive/Transmit Transition Guard interval (TTG and RTG respectively). Each DL subframe starts with a preamble followed by the Frame Control Header (FCH), the DL-MAP, and the UL-MAP.

The FCH contains the DL Frame Prefix (DLFP) to specify the burst profile and the length of the DL-MAP. The DLFP is a data structure transmitted at the beginning of each frame and contains information regarding the current frame; it is mapped to the FCH.

Simultaneous DL allocations can be broadcast, multicast and unicast and they can also include an allocation for another BS rather than a serving BS. Simultaneous ULs can be data allocations and ranging or bandwidth requests.

SUMMARY OF EXAMPLE EMBODIMENTS

In accordance with one embodiment of the present invention, a timing adjustment method for use in a multi-hop communication system is provided. The system includes a source apparatus, a destination apparatus and one or more intermediate apparatuses, said source apparatus being operable to transmit information along a series of links forming a communication path extending from the source apparatus to the destination apparatus via the or each intermediate apparatus, and the or each intermediate apparatus being operable to receive information from a previous apparatus along the path and to transmit the received information to a subsequent apparatus along the path, the system being configured to transmit information in a plurality of consecutive labelled intervals. The method includes transmitting information in a first labelled interval from a first said apparatus along a plurality of consecutive links of said path via one or more said intermediate apparatuses to a second said apparatus, said information including a reference to a particular one of said labelled intervals and the transmission of that information incurring a delay such that the transmitted information, or information derived therefrom, is received by said second apparatus in a second labelled interval a number of such intervals after the first labelled interval. The method also includes adjusting said reference to form an adjusted reference referring to a further labelled interval the or another number of such intervals before or after the particular labelled interval.

BRIEF DESCRIPTION OF THE DRAWINGS

For a more complete understanding of particular embodiments of the present invention and its advantages, reference is now made to the following description, taken in conjunction with the accompanying drawings, in which.

DETAILED DESCRIPTION

With signaling in a multi-hop environment there may be some issues with delays, possibly causing frame latency.

For example, a sleep-mode mobile station (MS) will switch its status to sleep or awake, when falling into sleep window or listening window respectively. In other words, within sleep window, base station (BS) and relay station (RS) cannot transmit messages to MS, while within listening window they can. Normally, BS controls the types of sleep mode, and the timing information of each window.

Figure 1:
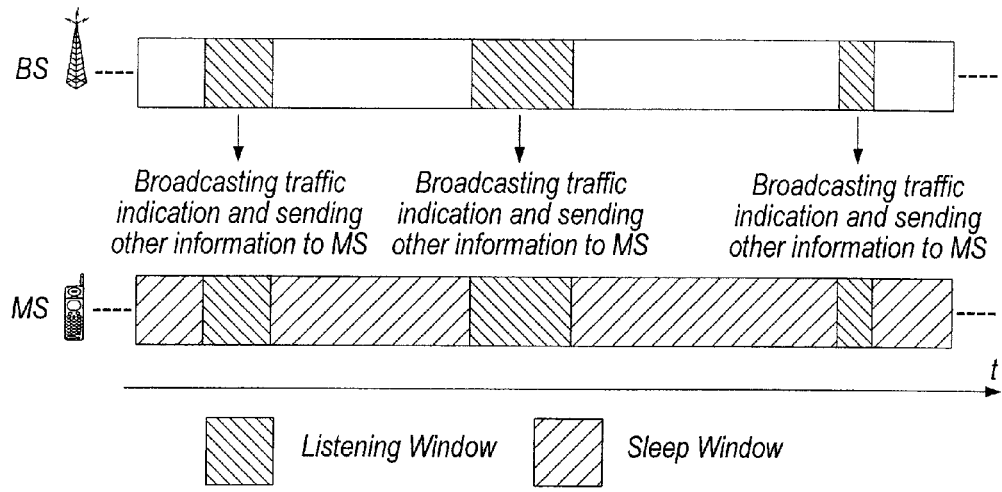
FIG. 1 shows an example of sleep mode in WiMAX.

As shown in FIG. 1, a BS will schedule listening, and sleep windows for MS. During listening window, the BS will exchange information with MS. Especially, the BS will transmit a traffic indication to MS during listening window to indicate whether there is buffered packet to MS. Therefore, the MS has to be synchronized with BS to ensure exchanging important information during listening windows.

In WiMAX relay systems, the relay station (RS) will relay uplink or downlink information for mobile stations (MSs) and base station (BS).

If the RS just relays the uplink, then it may have no knowledge about the control messages transmitted by BS to MS (downlink), which affect uplink communication. For example, in WiMAX sleep mode, an RS shall allocate bandwidth for MS on time for a scheduled event, which is instructed by a downlink message. This downlink message may not be decoded by RS. Therefore, new mechanisms should be designed to support RS to obtain the relevant control information sent by downlink messages.

Moreover, if the RS relays both the uplink and downlink, it should make sure the MS can be synchronized with BS, especially for sleep-mode MSs. For instance, when an RS cannot relay the timing control information within the current frame, the RS shall adjust the timing information transmitted from BS to MS.

Details of the Preferred Power Saving Method

We consider two WiMAX relay scenarios, and propose new algorithms to solve the problems of the sleep mode within these scenarios.

Scenario A: Relay Station Relays Both Downlink and Uplink

Figure 2:
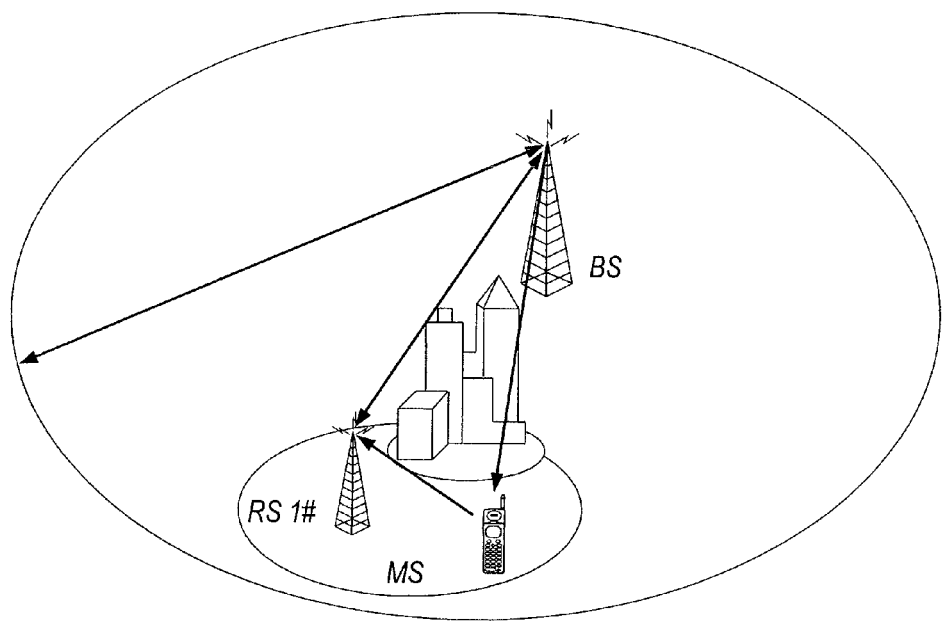
FIG. 2 shows the RS only relays uplink information for MS.

As shown in FIG. 2, the relay station (RS) only relays MS's uplink, and the MS can receive all downlink information from BS directly, which means the uplink and downlink is asymmetric.

Since the RS cannot hear control messages transmitted by BS to MS (in downlink), which will affect the uplink communication between MS and BS, then the RS may not perform proper operations, such as resource allocation, to meet the relevant demands of those control messages.

For example, in sleep mode, MSs may perform scheduled operations, such as ranging requests. These operations normally will be instructed by the control message in downlink. If the RS does not decode these messages, it cannot allocate resources to MSs on time, thus the scheduled operations may failed.

Figure 3:
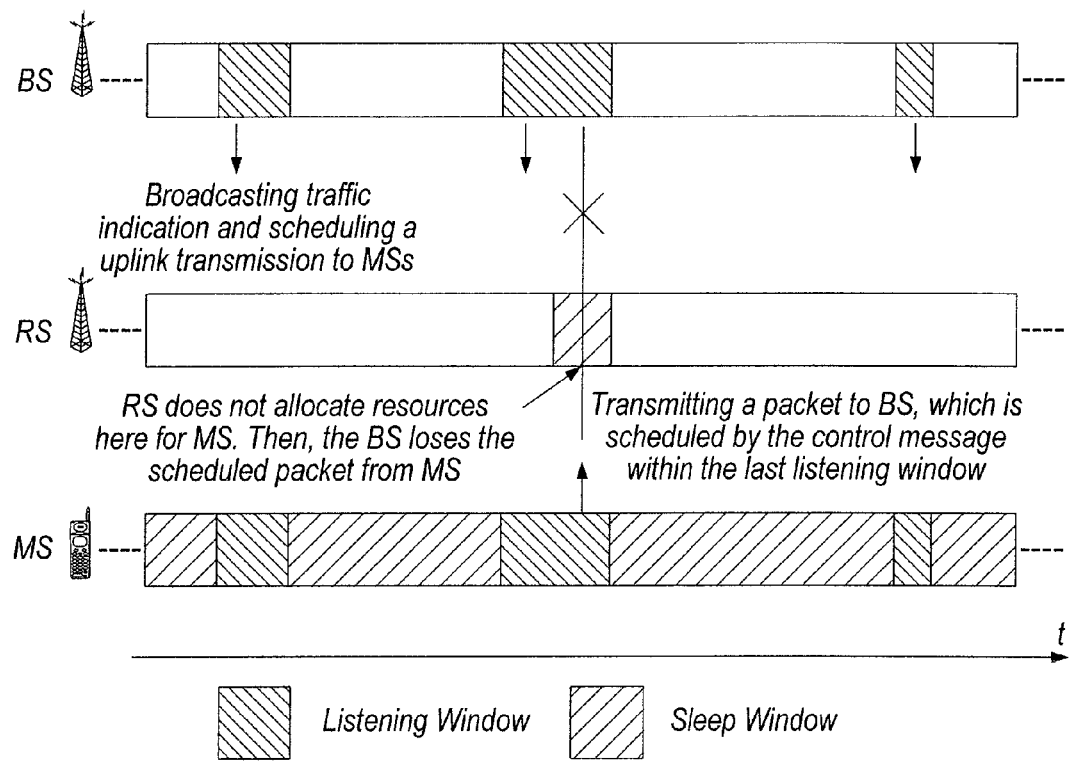
FIG. 3 shows if an RS does not have timing knowledge of a sleep-mode MS, then it cannot allocate resources on right time for relaying.

As shown in FIG. 3, if RS does not know any sleep-mode timing information in the sleep-mode MS, it cannot allocate relay resources for MS to using uplink on time, thus degrading the uplink communication.

Figure 4:
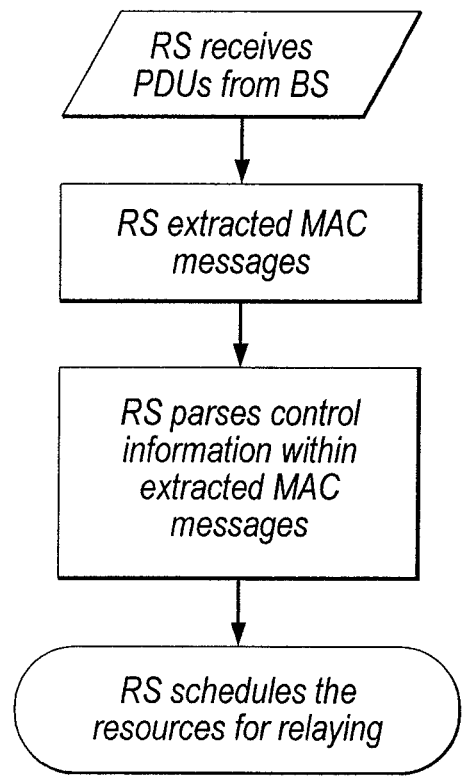
FIG. 4 shows the algorithm in RS to solve the problem introduced by the asymmetric links between uplink and downlink.
Figure 5:
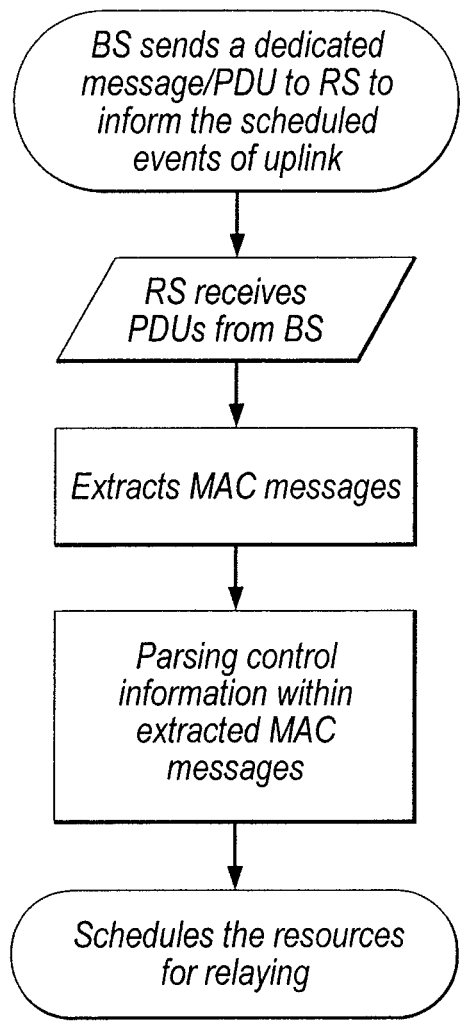
FIG. 5 shows if an RS cannot obtain enough control information for uplink, the BS may transmit a dedicated message to this RS to inform the scheduled events in uplink.

There are two algorithms for RS to solve this problem introduced by the asymmetric links between uplink and downlink, as shown in FIG. 4, and FIG. 5.

In the method illustrated in FIG. 4, firstly, an RS will receive PDUs (Protocol Data Units) from BS. Then, it will extract the MAC messages from the received PDUs, and parse the controlling information, which will influence the uplink transmission. Eventually, in terms of the parsed controlling information, the RS shall properly schedules the resources, such as time window, and subchannels (or frequency bands), for MSs transmitting message to BS.

In the method illustrated in FIG. 5, if an RS cannot fully collect all the controlling information, which will affect the uplink communication, the BS can send a dedicated message to RS to inform the scheduled events in uplink.

To clearly explain the implementation of the proposed algorithms in sleep mode in WiMAX relaying systems, the message flow charts are described below.

Message Chart for Starting the Sleep Mode

Figure 6:
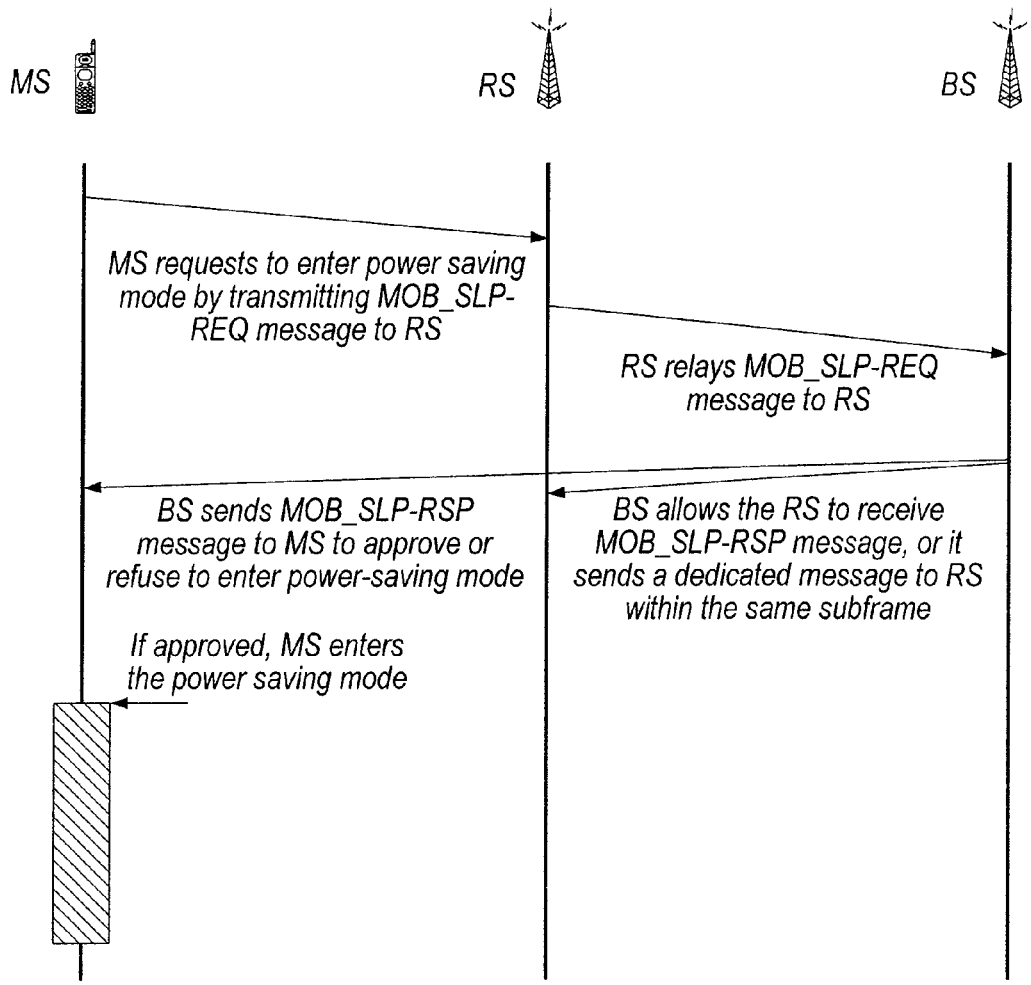
FIG. 6 shows an MS requests to start sleep mode.

A sleep mode can be requested by MS, RS, or BS. FIG. 6. shows the message flow chart when an MS wants to start sleep mode.

If an MS wants to start sleep mode, it shall asks RS to relay a MOB_SLP-REQ message to BS to request to entering sleep mode.

The BS can approve or refuse the request by sending a message, MOB_SLP-RSP. The BS also needs to ensure the RS can receive the corresponding information in this MOB_SLP-RSP message within the same subframe by sending a dedicated message to RS or allowing RS to receive the sleep-mode control messages.

The message, MOB_SLP-RSP, will indicate the timing information of sleep and listening windows, such as start frame number for first sleep window, size information of the listening window, and sleep window. These parameters should also be recorded by RS.

If MS cannot hear any response message from BS within a fixed period, it means the request is failed. Then, if necessary, the MS will restart to send MOB_SLP-REQ to RS.

In lights of the received messages, the RS can schedule the resources for uplink relaying, or it may stop to allocate bandwidth to the corresponding MS.

Figure 7:
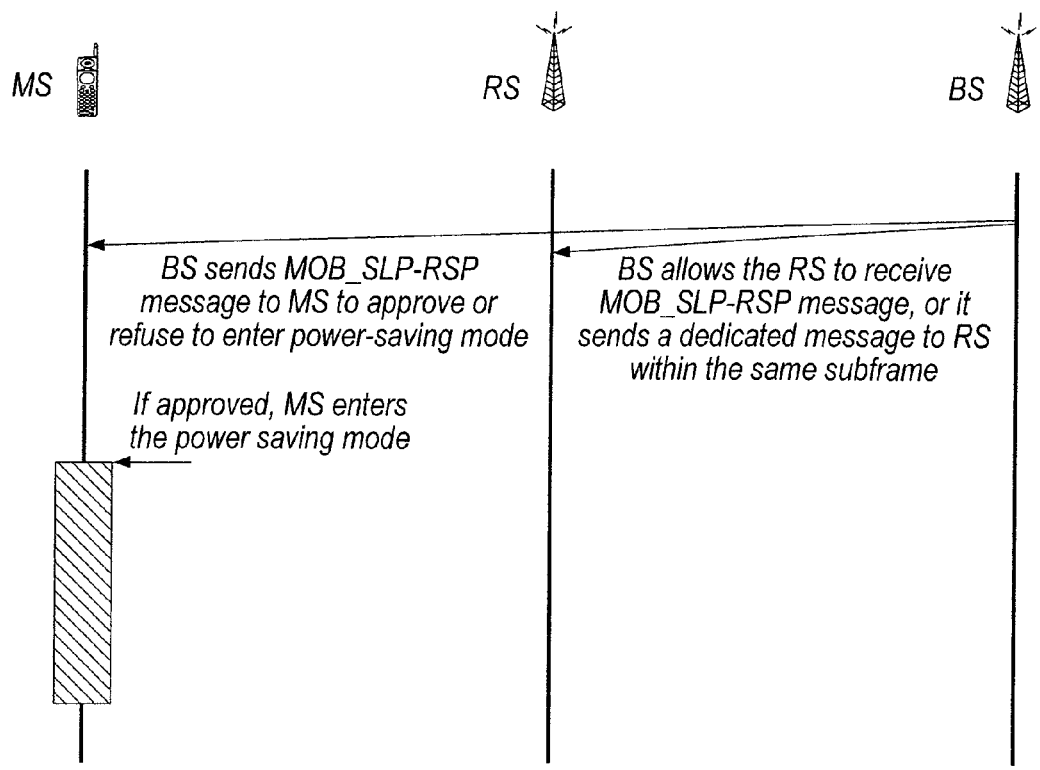
FIG. 7 shows a message flow chart when a BS wants to start sleep mode (BS requests to start sleep mode)

The sleep mode also can be requested by BS. FIG. 7. shows the message flow chart when a BS wants to start sleep mode.

Figure 8:
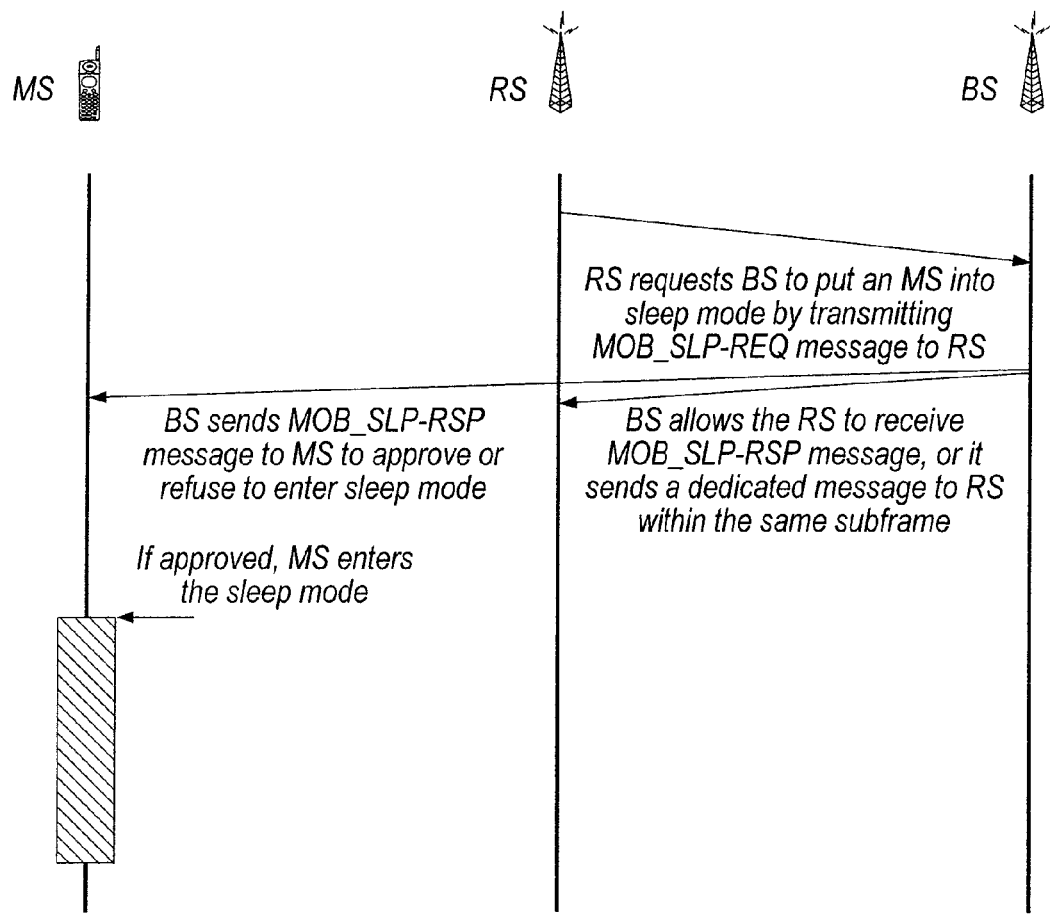
FIG. 8 shows a message flow chart when a BS wants to start sleep mode (RS asks BS to put an MS into sleep mode)

The sleep mode also can be requested by RS. For example, when an RS has not enough bandwidth resources for its MSs, it may put some MSs with lower QoS demands into sleep mode. FIG. 8. shows the message flow chart when a BS wants to start sleep mode.

Maintaining the Sleep Mode

During the listening window, the BS will transmit traffic indication to MS, and MS shall be awake to receive the necessary information within downlink subframe. The BS also needs to send the traffic indication and other controlling information relating to this MS to the corresponding RS in the same subframe, thus the RS can predict when the MS will fall in sleep, and can avoid communicating with the MS when it is sleeping.

If an MS receives a traffic indication, which indicates that BS has buffered traffic, the MS will keep awake to receive the information from BS until receiving an MOB_SLP-REQ message from BS again. In terms of the information within the received MOB_SLP-REQ, the MS will fall into sleep mode again or terminate the sleep mode.

During the listening window, the RS may allocate bandwidth for MS to maintaining the connections with active Power-Saving Class.

Figure 9:
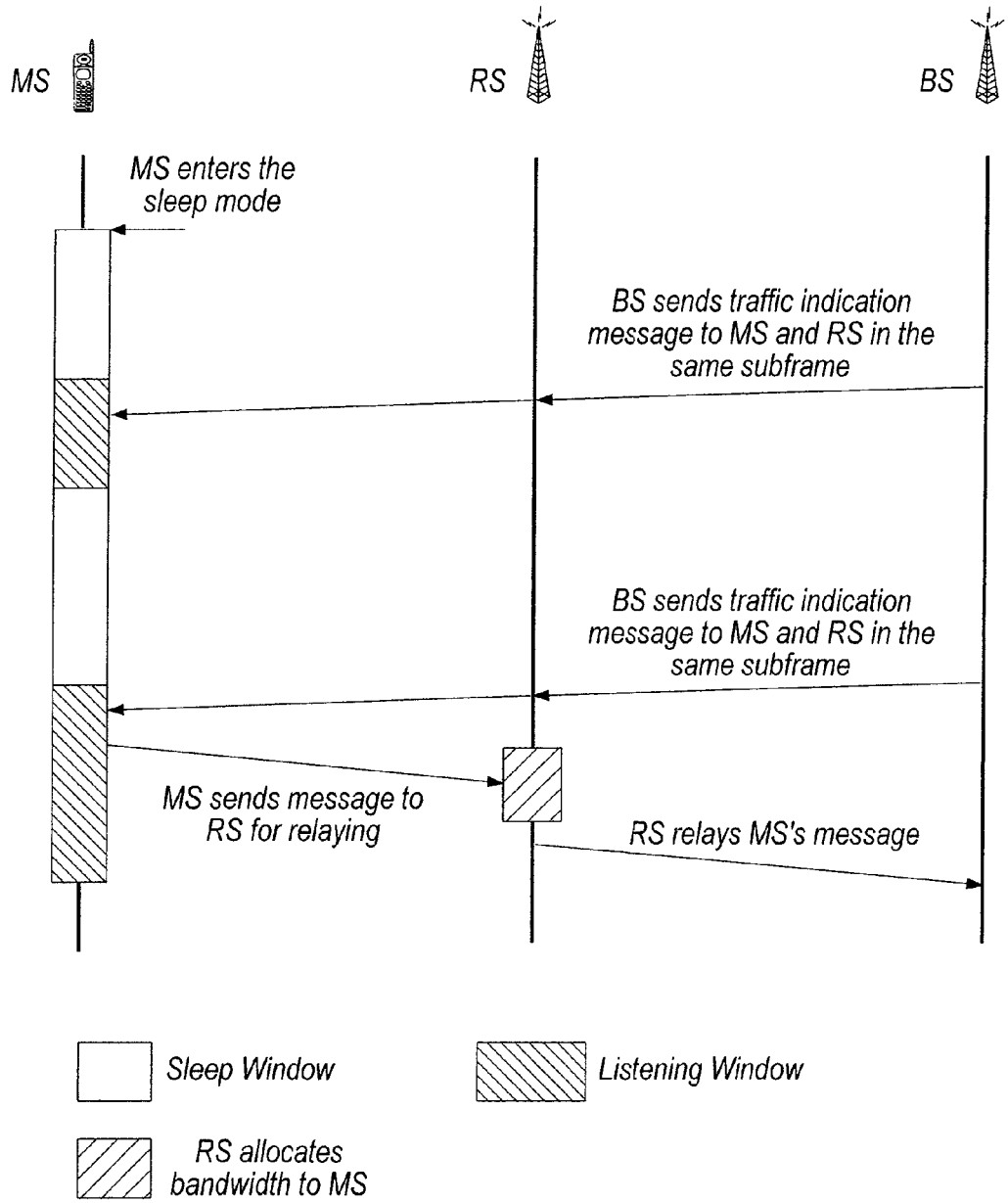
FIG. 9 shows a message flow chart, when an MS in sleep mode (an RS shall allocate bandwidth to MS on time for the scheduled transmission in MSs)

FIG. 9. shows the message flow chart, when an MS in sleep mode.

The corresponding message flow chart is shown in FIG. 5.

Terminating the Sleep Mode

The sleep mode can be terminated by BS, RS, or MS.

Figure 10:
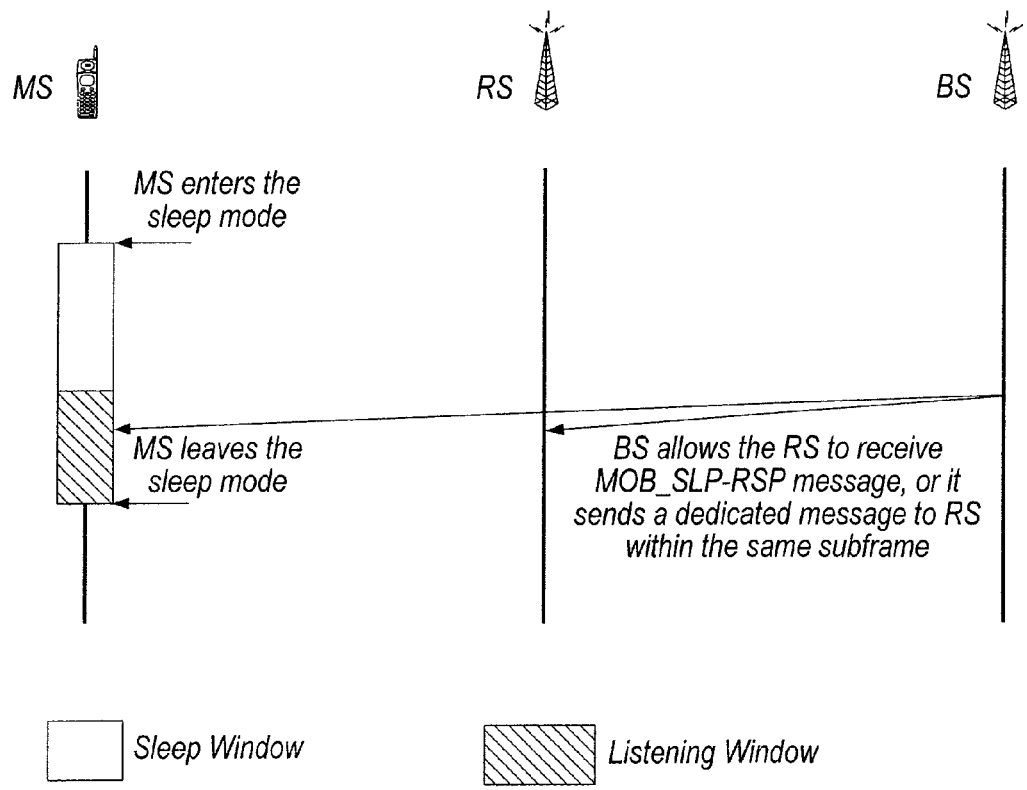
FIG. 10 shows BS sending MOB_SLP-RSP to both RS and MS to stop the sleep mode.

If BS wants to terminate the sleep mode, it has to send a MOB_SLP-RSP to MS and RS within a listen window to tell them when the sleep mode should be ceased. The message flow chart is shown in FIG. 10.

Figure 11:
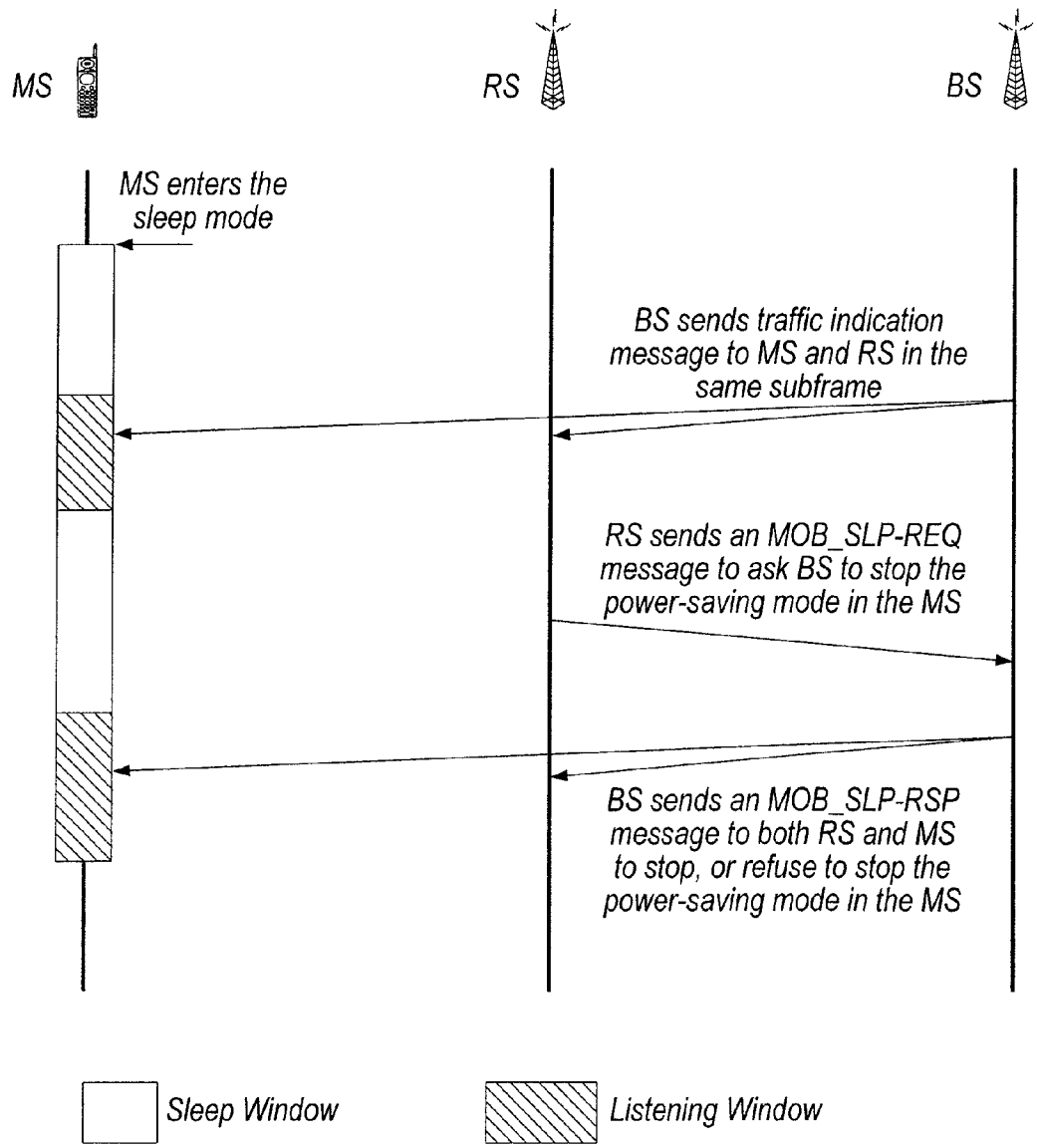
FIG. 11 shows an RS can request to stop the sleep mode in an MS.

If an RS wants to stop a sleep mode for an MS, it will send an MOB_SLP-REQ message to BS to request to stop this MS's sleep mode. Then the BS will send the MOB_SLP-RSP message to both the RS and MS to stop the MS's sleep mode, or to refuse to cease the sleep mode. The corresponding message flow chart is shown in FIG. 11.

Figure 12:
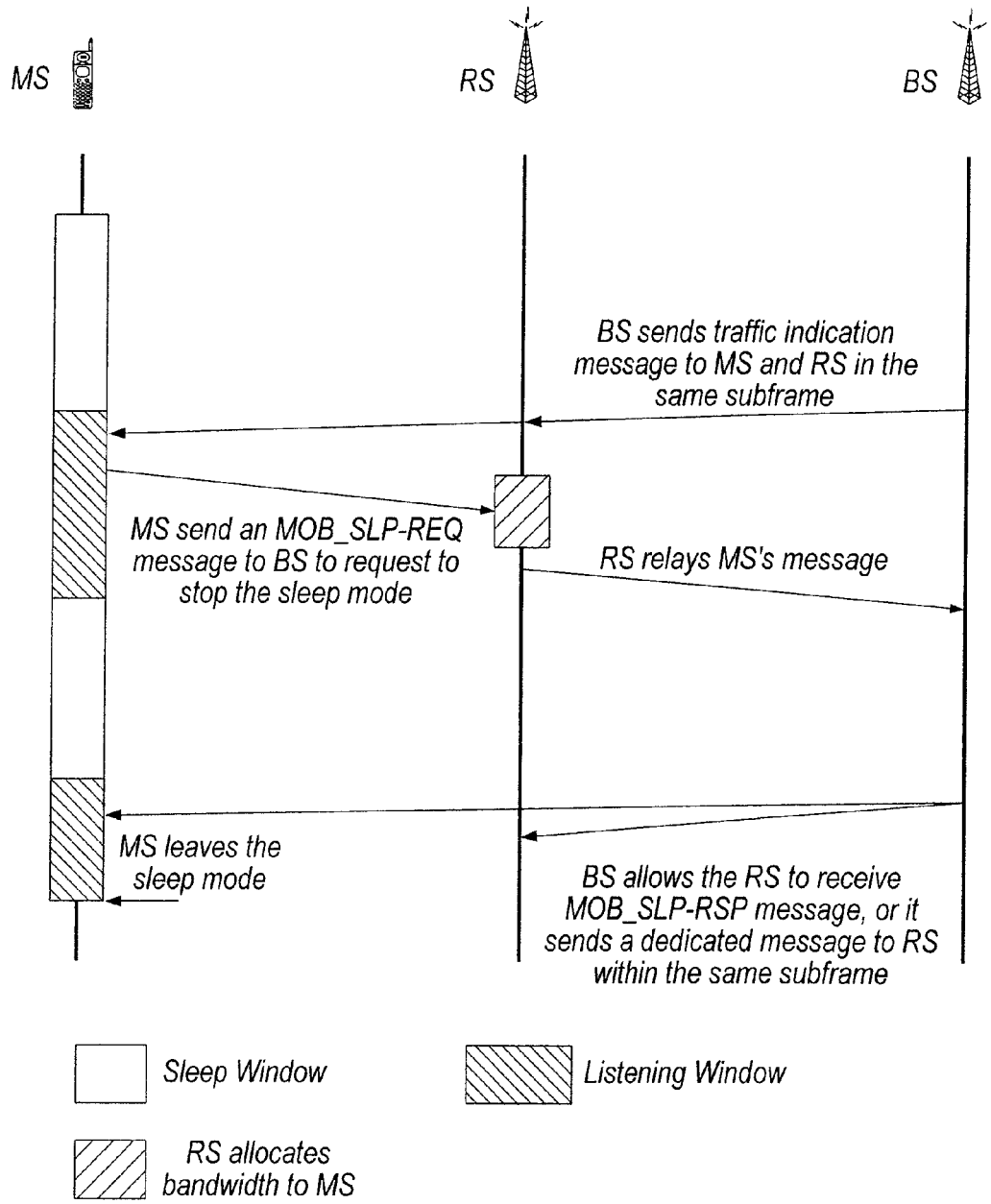
FIG. 12 shows an MS can request to stop the sleep mode.

If the MS wants to stop the sleep mode, it firstly needs to send an MOB_SLP-REQ message to BS through the RS. Then, the BS will send an MOB_SLP-RSP message to both RS and MS to either stop the sleep mode, or refuse to stop it. The message flow chart is shown in FIG. 12.

Scenario B: Relay Station Only Relays Uplink for MS

Figure 13:
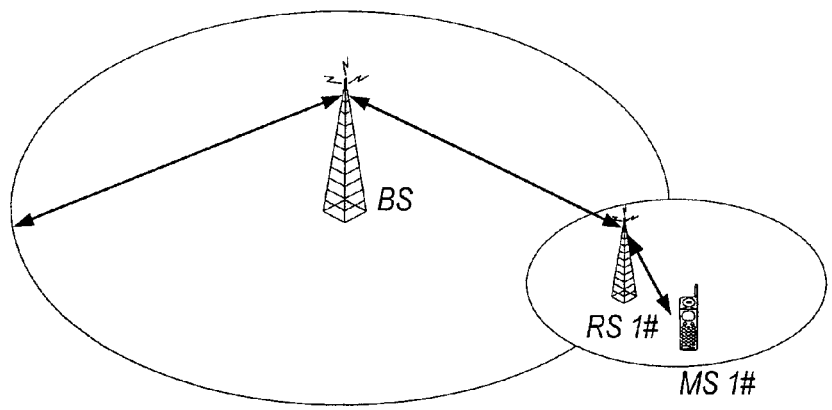
FIG. 13 shows an RS relays both the uplink and downlink.

In this scenario (FIG. 13), the RS relays both the uplink and downlink.

If the RS cannot relay the control messages, which are enclosing timing information, to MSs within the same frame (For example, the RS may not have enough resources to relay the control messages to MSs within current frame), then these control information will be delayed by at least one frame. In this case, the absolute timing information within these timing-related messages for MSs shall be shifted by the corresponding latency introduced by relaying. If the communication is bi-directional, the RS also needs to inform BS the modified the timing information, thus guaranteeing the uplink communication as well.

Figure 14:
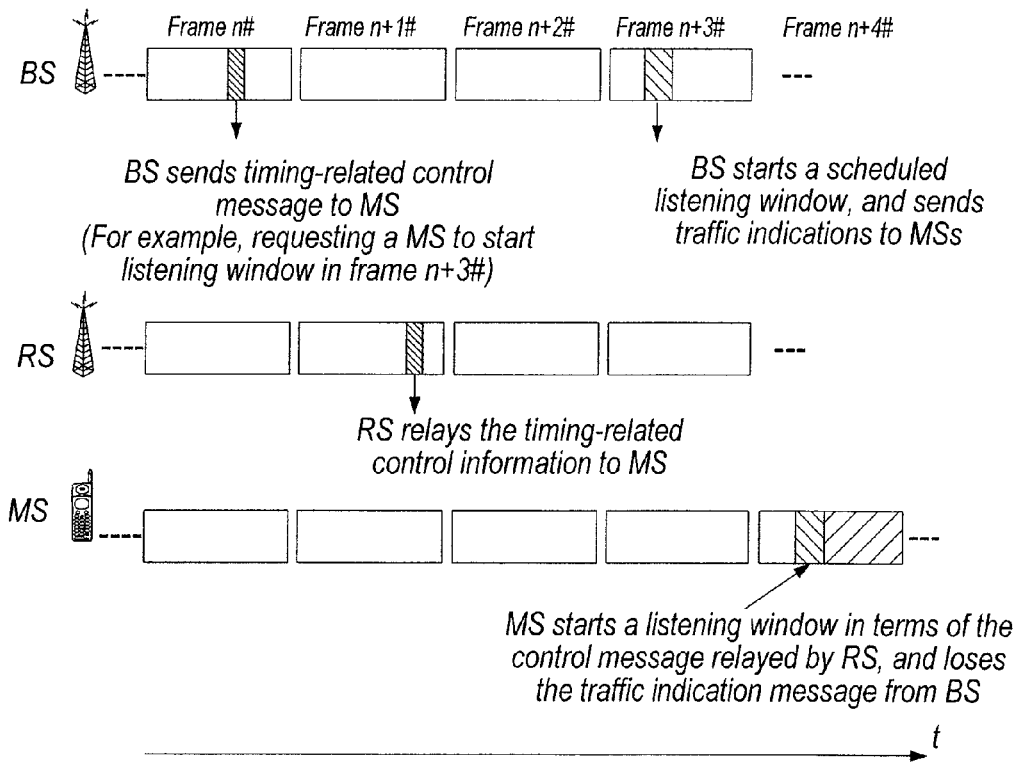
FIG. 14 shows an MS loses the synchronization with BS because the RS introduces one-frame delay.

For example, as shown in FIG. 14, a BS informs the MS to enter sleep mode and start a listening window after two frames, which is in the frame n+3#. Since the RS introduces one-frame delay, the MS actually starts the listening window in the frame n+4#, thus losing the synchronization with BS.

Figure 15:
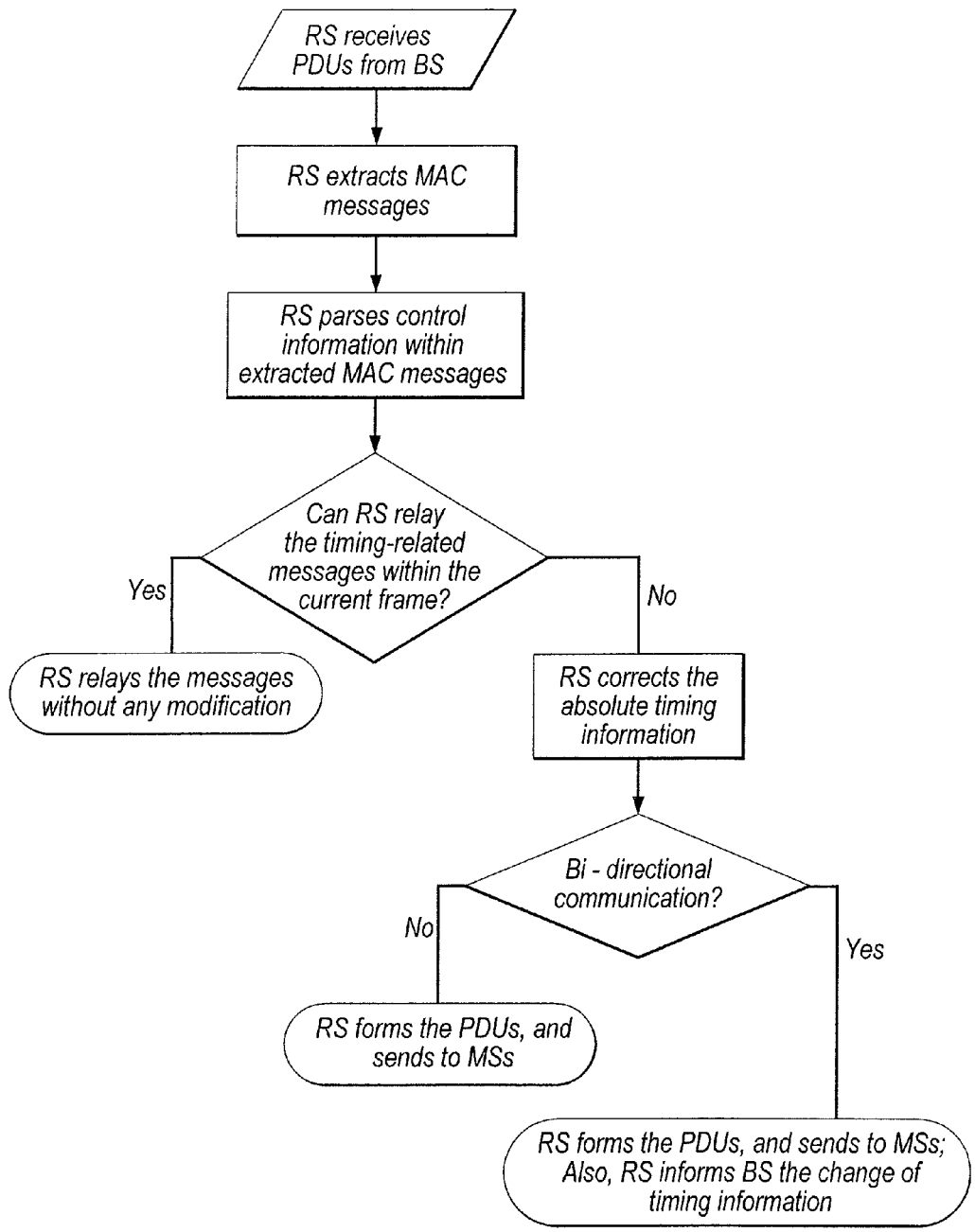
FIG. 15 shows an MS loses the synchronization with BS because the RS introduces one-frame delay (when RS will delay timing-related control messages, it shall modify the messages to compensate the delay)
Figure 16:
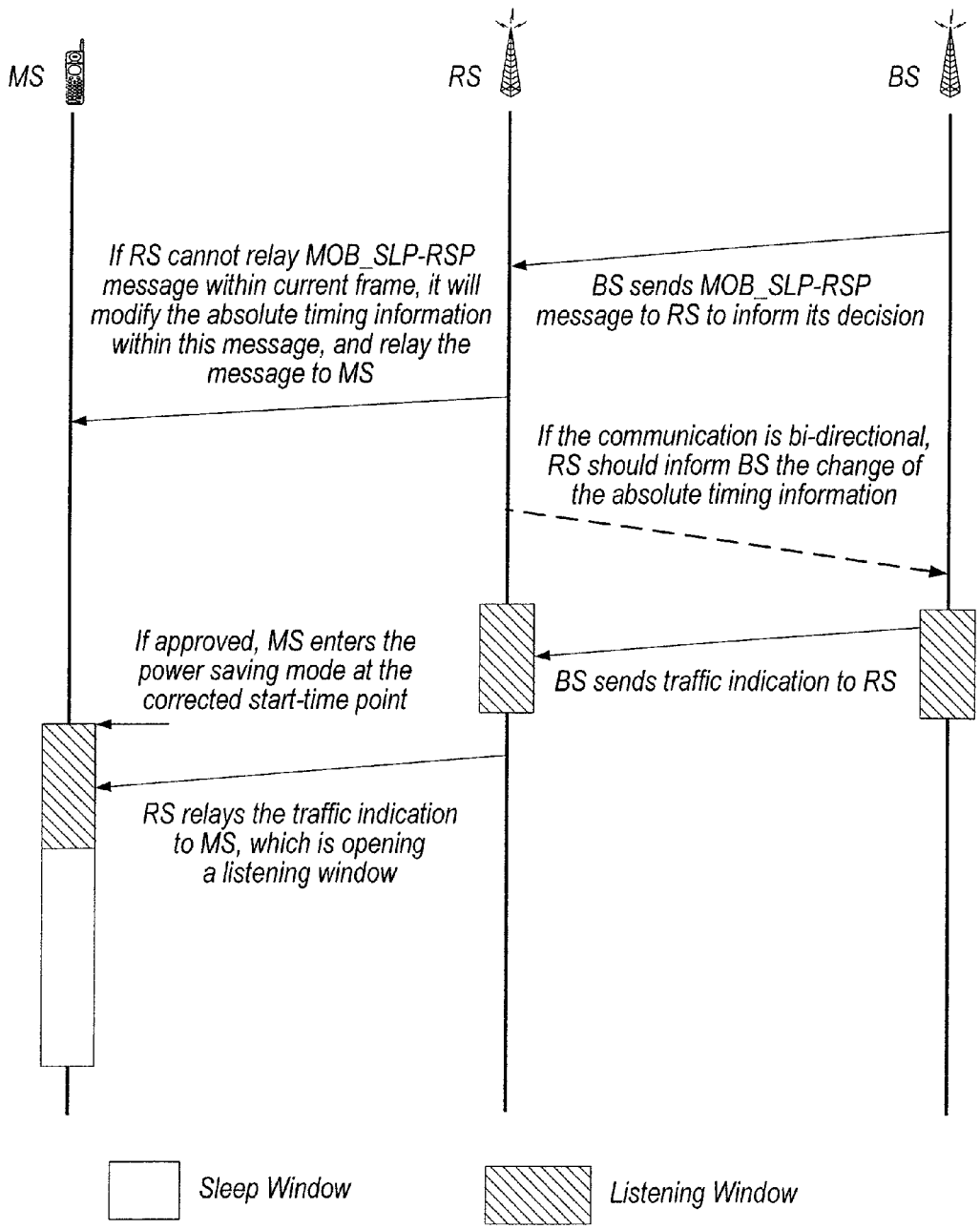
FIG. 16 shows RS shall modify the timing information to make sure that the MS can receive the information during listening windows.

FIG. 15 illustrates the proposed algorithm to solve this problem, when RS relays timing-related control message, such as MOB_SLP-RSP, and RNG_RSP messages in WiMAX. Firstly, an RS will receive PDUs (Protocol Data Units) from BS. Then, it will extract the MAC messages from the received PDUs, and parse the controlling information, which will influence the timing control in MSs. If the RS cannot relay a timing-related message within current frame, and the timing information is absolute, it will modify the timing information in this message, and relay the message to MSs to compensate its delay. If the communication is bi-directional, the RS also needs to inform the change of timing information to BS as well.

Figure 17:
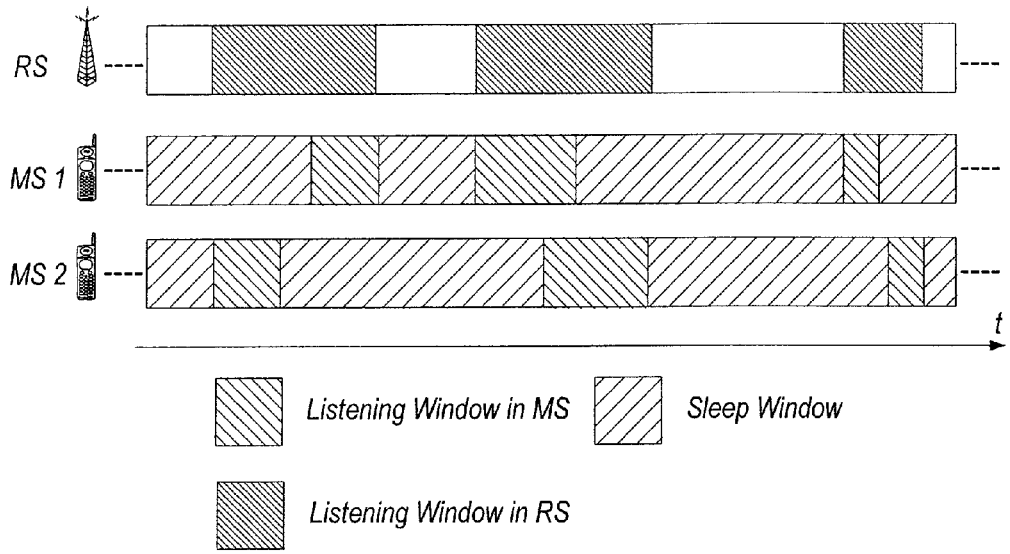
FIG. 17 shows an example that the start time of the first listen window in MS 2# does not aligned with MS 1#.
Figure 18:
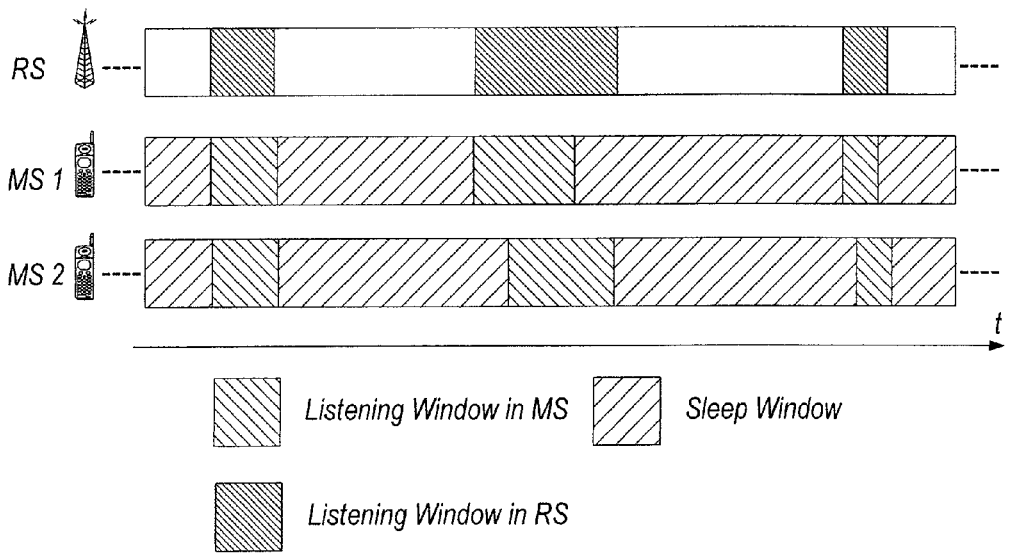
FIG. 18 shows the listening window in RS can be shortened by aligning the start time of the first listening window in MS 2#.
Figure 19:
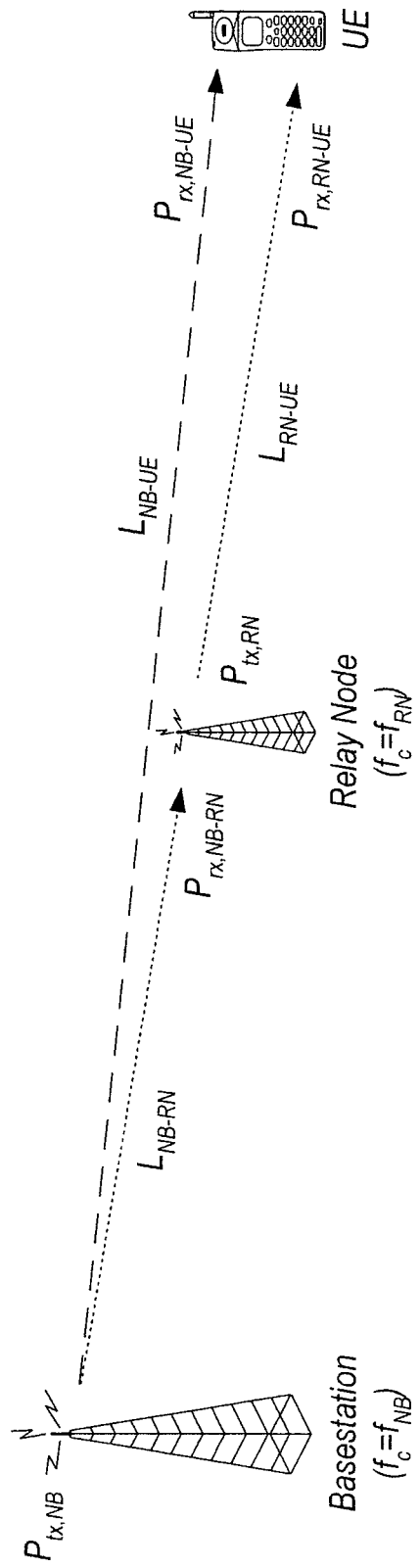
FIG. 19 shows a single-cell two-hop wireless communication system.
Figure 20A:
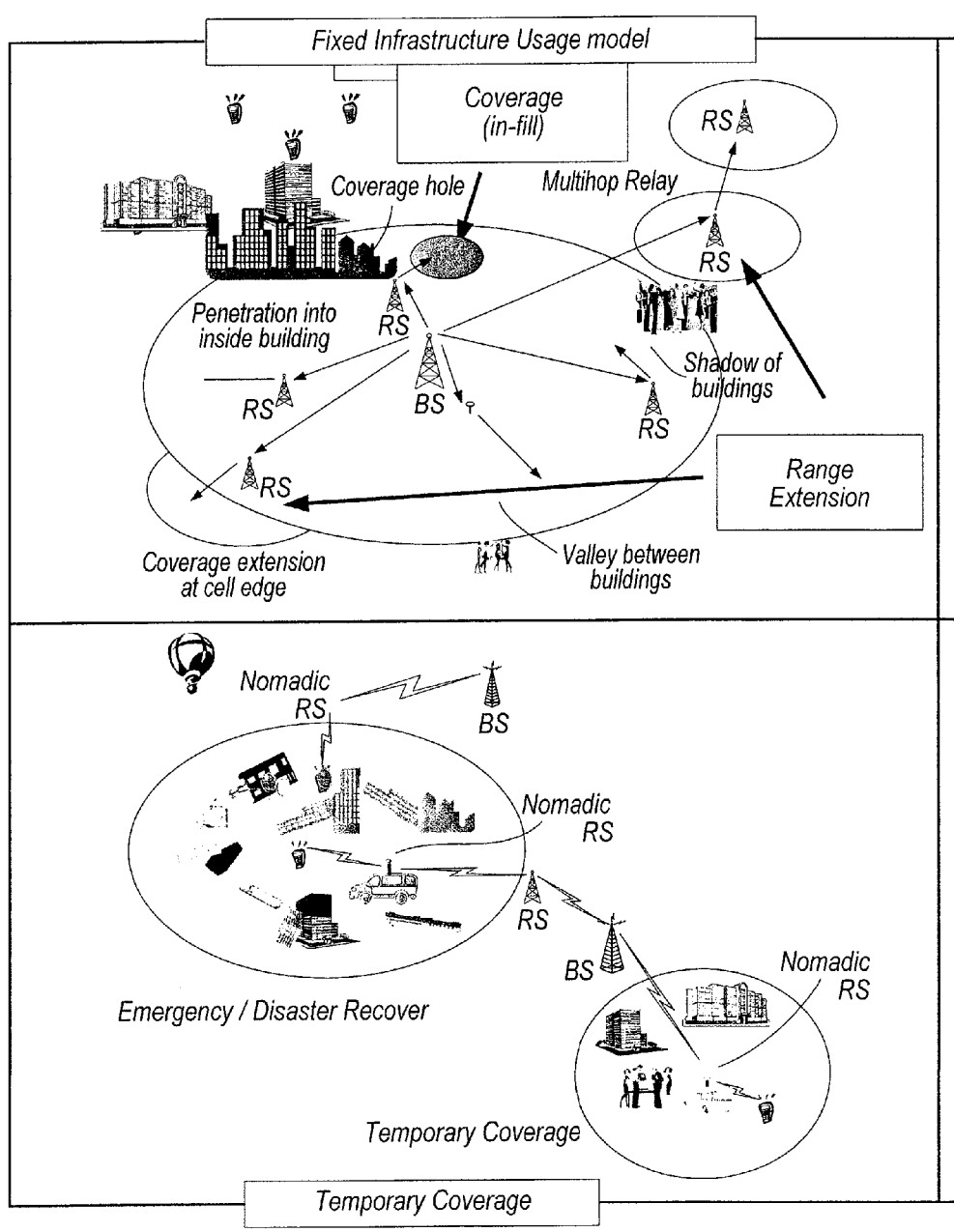
FIG. 20 shows applications of relay stations.
Figure 20B:
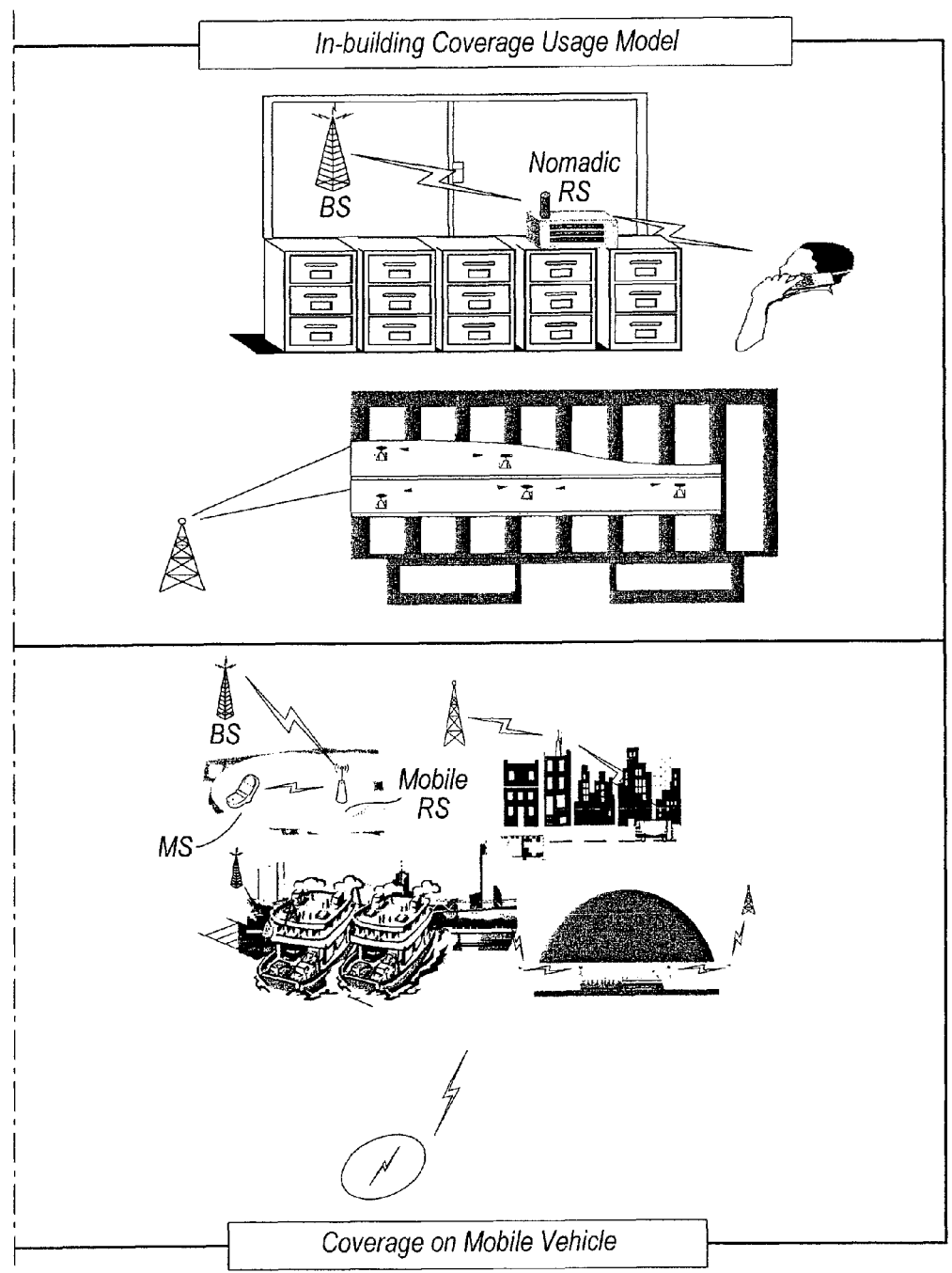
Figure 21:
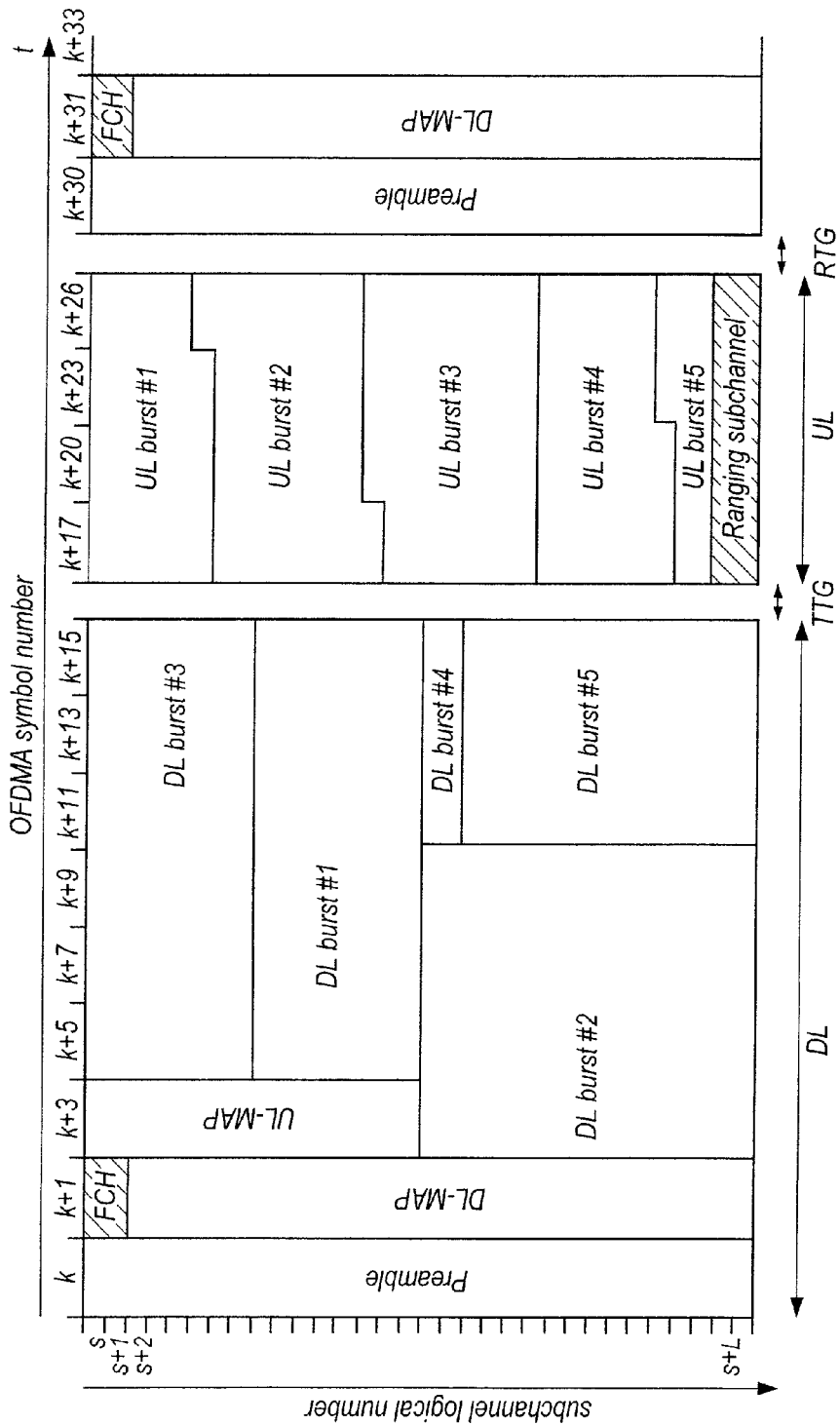
FIG. 21 shows a single hop TDD frame structure used in the OFDMA physical layer mode of the IEEE 802.16 standard.

If the system allows RS to enter sleep mode, the proposed algorithm can also be used to maximize the sleep duration for a RS. For example, when a BS informs an MS to enter sleep mode, the RS can modify the MS's start time of the first listening window to align the existed sleep-mode MS's start time of listening window, thus the possible listening window in RS can be decreased. FIG. 17 shows an example that the start time of the first listen window in MS 2# does not aligned with MS 1#. FIG. 18 shows the listening window in RS can be shortened by aligning the start time of the first listening window in MS 2#.

Main Benefits

The benefits from particular embodiments may include:
The proposed method gives an effective approach to support sleep mode in mobile station in WiMAX relaying systems;
The proposed method can have full compatibility with the IEEE802.16e standard;
When an RS just relays uplink traffic, the proposed method can ensure the RS has the knowledge of the scheduled uplink events, thus guaranteeing a stable uplink communication;
When an RS, which relays both uplink and downlink, will delay timing-related control messages from BS to MS, the proposed method can ensure the MS obtaining correct timing information, thus keeping synchronization between MS and BS;
The method can allow RS to request sleep mode for MSs;

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of a transmitter embodying the present invention. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

What is claimed is:

1. A signalling method for use in sleep-mode signalling in a wireless communication system, the system comprising a base station, a mobile station and at least one relay station, the method comprising:
transmitting a first message from the mobile station to the base station requesting entry into sleep mode;
transmitting a dedicated second message from the base station to the relay station which is not transferred to the mobile station, the second message informing the relay station about the sleep mode of the mobile station; and
transmitting a third message from the base station to the mobile station approving entry into sleep mode of the mobile station;
wherein the second and third messages are separate and each include a start frame number for a first sleep window of the mobile station, and wherein the relay station allocates relay resources for the mobile station on time for uplink transmission, and wherein the second and third messages are transmitted within the same downlink subframe.

2. The method according to claim 1, wherein the second and third messages include size information of sleep windows.

3. The method according to claim 1, wherein if the mobile station fails to receive the third message from the base station within a certain period, the mobile station retransmits the first message to the base station.

4. The method according to claim 1, wherein if the mobile station receives the third message from the base station, the mobile station enters sleep mode.

5. The method according to claim 1, wherein the first message is transmitted via the at least one relay station to the base station.

6. The signalling method according to claim 1 wherein relay delay is taken into account when the first message or third message is forwarded via the relay station.

7. A base station comprising:
a receiver configured to receive a first message from a mobile station via a relay station requesting entry into sleep mode; and
a transmitter configured to transmit a dedicated second message to the relay station only, informing the relay station about the sleep-mode of the mobile station and to transmit a third message to the mobile station approving entry into sleep mode of the mobile station;
wherein the second and third messages are separate and each include a start frame number for a first sleep window of the mobile station, and wherein the relay station allocates relay resources for the mobile station on time for uplink transmission, and wherein the second and third messages are transmitted within the same downlink subframe.

8. The base station according to claim 7, wherein the second and third messages include size information of sleep windows.

9. The base station according to claim 7, which is configured to decide whether to approve or refuse the request and to control transmission of the second and third messages.

10. A relay station comprising:
a receiver configured to receive a first message from a mobile station requesting entry into sleep-mode and a dedicated second message from a base station informing the relay station about the sleep-mode of the mobile station; and
a transmitter configured to transmit said received first message to a base station;
wherein the relay station is configured so that it does not transfer said second message to the mobile station; and
wherein the second message includes a start frame number for a first sleep window of the mobile station, and wherein the relay station is configured to allocate relay resources for the mobile station on time for uplink transmission, and
wherein the second and third messages are transmitted within the same downlink subframe.

11. The relay station according to claim 10, wherein the second message includes size information of sleep windows.

12. A wireless communication system comprising:
a base station comprising:
a receiver configured to receive a first message from a mobile station via a relay station requesting entry into sleep mode; and
a transmitter configured to transmit a dedicated second message to the relay station informing the relay status about the sleep-mode of the mobile station and to transmit a third message to the mobile station approving entry into sleep mode of the mobile station;
a relay station comprising:
a receiver configured to receive a first message from a mobile station requesting entry into sleep-mode and a second message from a base station informing the relay station about the sleep-mode of the mobile station; and
a transmitter configured to transmit said received first message to a base station;
wherein the relay station is configured so that it does not transfer said second message to the mobile station; and wherein the relay station is configured to allocate relay resources for the mobile station on time for uplink transmission;

wherein the second and third messages are separate and each include a start frame number for a first sleep window of the mobile station; and a mobile station, and wherein the second and third messages are transmitted within the same downlink subframe.

13. The wireless communication system according to claim 12, wherein the second and third messages include size information of sleep windows.

14. The wireless communication system according to claim 12 which is configured to decide whether to approve or refuse the request and to control transmission of the second and third messages.

* * * * *